(12) United States Patent
Jørgensen

(10) Patent No.: US 8,746,891 B2
(45) Date of Patent: *Jun. 10, 2014

(54) COLOR-COMBINING ILLUMINATION DEVICE

(75) Inventor: Dennis Thykjær Jørgensen, Rønde (DK)

(73) Assignee: Martin Professional A/S, Aarhus N. (DK)

( * ) Notice: Subject to any disclaimer, the term of this patent is extended or adjusted under 35 U.S.C. 154(b) by 121 days.

This patent is subject to a terminal disclaimer.

(21) Appl. No.: 13/383,741

(22) PCT Filed: Apr. 19, 2010

(86) PCT No.: PCT/DK2010/050086
§ 371 (c)(1),
(2), (4) Date: Mar. 1, 2012

(87) PCT Pub. No.: WO2011/006501
PCT Pub. Date: Jan. 20, 2011

(65) Prior Publication Data
US 2012/0154759 A1    Jun. 21, 2012

(30) Foreign Application Priority Data
Jul. 13, 2009 (DK) .................................. 2009 00860

(51) Int. Cl.
*G03B 21/00* (2006.01)

(52) U.S. Cl.
USPC ............... 353/31; 353/34; 353/37; 353/85; 353/98; 353/99; 362/227; 362/241

(58) Field of Classification Search
USPC ......... 353/30, 31, 33, 34, 37, 85, 98, 99, 100, 353/119; 362/227, 241, 247, 294, 545, 551, 362/555, 560–561; 348/742, 743, 744–747, 348/752, E9.027; 349/5, 7–9, 25, 29–30
See application file for complete search history.

(56) References Cited

U.S. PATENT DOCUMENTS 5,490,046 A * 2/1996 Gohl et al. ...................... 362/35
5,648,860 A * 7/1997 Ooi et al. ........................ 349/10

(Continued)

FOREIGN PATENT DOCUMENTS

CN    1095289    11/1994
CN    1595225    3/2005

(Continued)

OTHER PUBLICATIONS

International Application No. PCT/DK2010/050175; International Search Report, mailed Sep. 30, 2010, 8 pages.

(Continued)

*Primary Examiner* — Sultan Chowdhury
(74) *Attorney, Agent, or Firm* — Blank Rome LLP

(57) ABSTRACT

An illumination device a first light source array a first light source. The first light source can generate a first light beam having a first spectral distribution. The first light beam can propagate primarily in a first direction along an optical axis. A second light source array can be included, having a second light source that generates a second light beam having a second spectral distribution. Also included can be a first dichroic reflector positioned partially in the first and the second light beams. The first dichroic reflector can transmit a part of the first and the second light beams. The second light beam can propagate in a second direction towards a part of the first light source array and opposite the first direction. Further, a part of the second light beam can propagate primarily in first direction after being reflected by the first dichroic reflector.

20 Claims, 13 Drawing Sheets

(56) References Cited

U.S. PATENT DOCUMENTS

| | | | |
|---|---|---|---|
| 7,048,385 B2 * | 5/2006 | Beeson et al. | 353/97 |
| 7,101,050 B2 * | 9/2006 | Magarill et al. | 353/97 |
| 7,239,449 B2 | 7/2007 | Leitel et al. | |
| 7,766,507 B2 * | 8/2010 | Nakajima | 362/237 |
| 7,905,605 B2 | 3/2011 | Bierhuizen et al. | |
| 2002/0030812 A1 | 3/2002 | Ortyn et al. | |
| 2007/0103646 A1 | 5/2007 | Young | |
| 2013/0003388 A1 * | 1/2013 | Jensen et al. | 362/296.01 |

FOREIGN PATENT DOCUMENTS

| | | |
|---|---|---|
| CN | 101583903 | 11/2009 |
| JP | 2006-139044 | 6/2006 |
| WO | WO2008/072197 | 5/2006 |
| WO | WO2006054969 | 5/2006 |
| WO | WO2006/054969 | 6/2008 |
| WO | WO2011006501 | 1/2011 |

OTHER PUBLICATIONS

International Application No. PCT/DK2010/050175; International Written Opinion, mailed Sep. 30, 2010, 10 pages.

International Application No. PCT/DK2010/050086; International Search Report, mailed Sep. 30, 2010, 8 pages.

International Application No. PCT/DK2010/050086; International Written Opinion, mailed Sep. 30, 2010, 10 pages.

Danish Patent Application No. PA 2009 00860; Office Action, issued Feb. 24, 2010, 3 pages.

Danish Patent Application No. PA 2009 00860; Search Report, issued Feb. 24, 2010, 2 pages.

English translation; Chinese Office Action dated May 30, 2013; Chinese Application No. 2010800311890; 2 pages.

English translation; Chinese Search Report; Chinese Application No. 2010800311890; Dated May 30, 2013; 5 pages.

Chinese Office Action dated May 30, 2013; Chinese Application No. 2010800311890; 5 pages.

First Office Action; Chinese Application No. 2010800301808; Filing Date: Jul. 5, 2010; 4 pages.

Search Report; Chinese Application No. 2010800301808; Filing Date: Jul. 5, 2010; 2 pages.

Extended European Search Report dated Feb. 17, 2014 issued for a related/corresponding European Application; European Application No. 10799453.5; 8 pages.

* cited by examiner

COLOR-COMBINING ILLUMINATION DEVICE

FIELD OF THE INVENTION

The present invention relates to illumination devices for combining light from different light sources generating light beams of different colors into one light beam. The present invention also relates to display devices and moving heads comprising such illumination device.

BACKGROUND OF THE INVENTION

Optical systems, such as profile lamps or projectors, are limited in output by Etendue E=A*Ω, as the gate through which light is emitted has a limited opening area A and the imaging optics only collect light from a limited solid angle Ω. For light sources the Etendue can be calculated in the same way, where A is the radiating area, and Ω is the solid angle it radiates into.

It is fundamentally only possible to effectively utilize light sources of same or less Etendue as the imaging optics in this kind of optical system. So if the source Etendue is a close match to the Etendue of the imaging system there are no gains in using multiple sources in order to increase the light output (intensity/lumen) as the Etendue of the light sources then will be larger than the Etendue of the imaging system and the imaging system is thus not capable of collecting the light.

However there is an exception to this when the sources are of different colors and have spectral compositions with only a little overlap in spectrum. Then it will be possible to combine the different sources (colors) by an arrangement of appropriately-designed dichroic band pass/band stop (reflecting) filters. This is a well-known principle from LCD projectors, where "color cubes" are used to combine red, green and blue into white. Such color cube system is illustrated in FIG. 1b. For an illumination system red green and blue can also be combined by use of single sheets of dichroic reflectors/filters, such as the illumination systems illustrated in illustrated in FIGS. 1a, 1c and 1d.

One disadvantage of these known color combiner solutions is the inability to combine sources with overlapping spectrums efficiently. White phosphor converted LED's have the highest efficacy of currently available LEDs and are therefore crucial for an efficient color mixing luminaire. Furthermore, the broad spectrum emitted by phosphor converted white and amber LED's can help improve the color rendering index of the light output compared to simple RGB LED solutions.

Another disadvantage of the known color combiners is the complexity of their production because three planes of sources and angled combiner filters require a lot of space.

U.S. Pat. No. 7,239,449 discloses an illumination module for color display, preferably for use in data or video projectors as well as rear projection television sets, in which the light from at least three luminescent diodes (LEDs) or LED arrays of the base colors red, green and blue is collimated at a point provided for connection to a display unit and ranged on an optical axis of the illumination module. An LED or an LED array of a base color with a beam path (Lr) oriented in the direction of the display unit is arranged on the optical axis of the illumination module. For the purpose of color mixing, the LEDs and LED arrays of the other base colors are attached in such a way that their beam paths (Lg, Lb) are laterally input in sequence under input angles (alpha, beta) of <90 degrees into the beam path (Lr) of the first base color.

WO2008/072197 discloses for instance a color cube system similar to the one illustrated in FIG. 1b. JP2006-139044 discloses both a color cube system similar to the one illustrated in FIG. 1b and a color-combining system using successive single sheets of dichroic reflectors/filters similar to systems illustrated in FIGS. 1a and 1c. WO2006/054969 illustrates a moving head light fixture based on a color cube system like the one illustrated in FIG. 1b and another moving head light fixture based on successive single sheets of dichroic reflectors/filters similar to systems illustrated in FIGS. 1a and 1c.

DESCRIPTION OF THE INVENTION

The object of the present invention is to solve the problems described above. This can be achieved by the invention as defined by the independent claims and the benefits and advantages of the present invention are disclosed in the detailed description of the drawings illustrating the invention.

DETAILED DESCRIPTION OF THE DRAWINGS

Figure 1A:
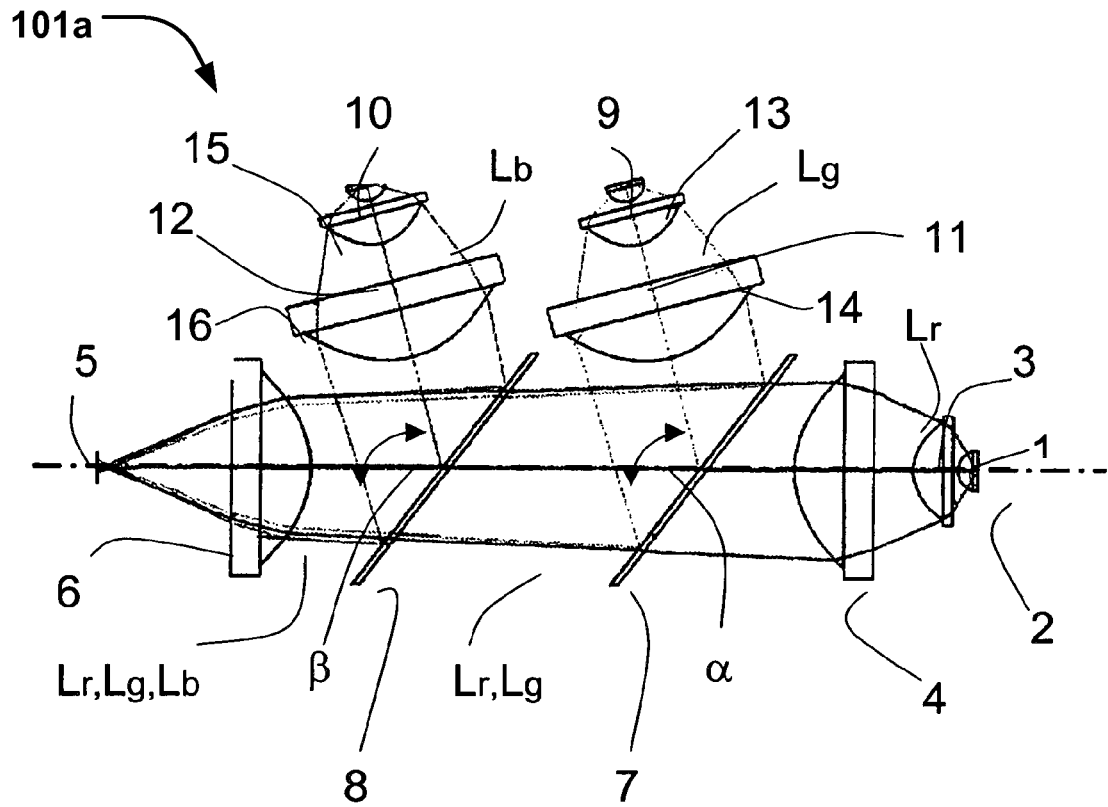
FIGS. 1a-1d illustrate prior-art color-combining systems.

FIG. 1a illustrates the prior-art color-combining system 101a disclosed by U.S. Pat. No. 7,239,449 and shows a red LED 1 whose optical axis lies on the optical axis 2 of the illumination module, wherein the light beams Lr are collimated through convergent lenses 3 and 4. For the purpose of focusing the light beams Lr onto the light entry surfaces 5 of a light-mixing rod, which is not depicted in detail, an additional convergent lens 6 is located in the beam path. The convergent lenses 3, 4 and 6 are broadband lumenized plastic lenses which each have at least one aspheric surface and are arranged on the optical axis 2 in such a way that the aspheric surfaces of the convergent lenses 3 and 4 are oriented toward the light entry surface 5 and the aspheric surface of the convergent lens 6 is oriented toward LED 1.

For the purpose of laterally inputting the colors green and blue on the optical axis 2, two dichroic filters 7 and 8 and arranged between the convergent lenses 4 and 6, wherein dichroic filter 7 is arranged in such a way that it adds the light beams Lg emitted by a green LED 9 to the red beam path Lr. In this connection, dichroic filter 8 assumes the function of adding the light beams Lb emitted by a blue LED 10 to the already mixed beam path comprising the red light beams Lr and the green light beams Lg.

The optical axis 11 of the green LED 9 and the optical axis 12 of the blue LED 10 are placed at angles of incidence alpha and beta relative to the optical axis of the red LED 1 and/or relative to the optical axis 2 of the illumination module, wherein alpha and beta each are 75 degrees.

The light beams Lg collimated by the green LED, impinge upon the dichroic filter 7 through the convergent lenses 13 and 14, and are added to the light beams Lr, which are completely transmitted by the dichroic filter 7. In analogy to the addition of the light beams Lg, the light beams Lb emitted by the blue LED 10, impinge upon the dichroic filter 8 through the convergent lenses 15 and 16 and, together with the already combined light beams Lr and Lg, are deflected into the light entry surface 5. As already mentioned, the mixed light beams Lr, Lg and Lb are focused into the light entry surface 5 of a light-mixing rod by means of the convergent lens 6.

Dichroic filters 7 and 8 have anti-reflective coated rear surfaces, thus allowing the light beams Lr to be completely transmitted by dichroic filter 7 and the light beams Lr and Lg to be completely transmitted by dichroic filter 8. Because the addition of the light beams Lg and Lb is to take place with virtually no loss of light, dichroic filters 7 and 8 are provided with special thin-layer systems which act as long-pass filters.

Figure 1B:
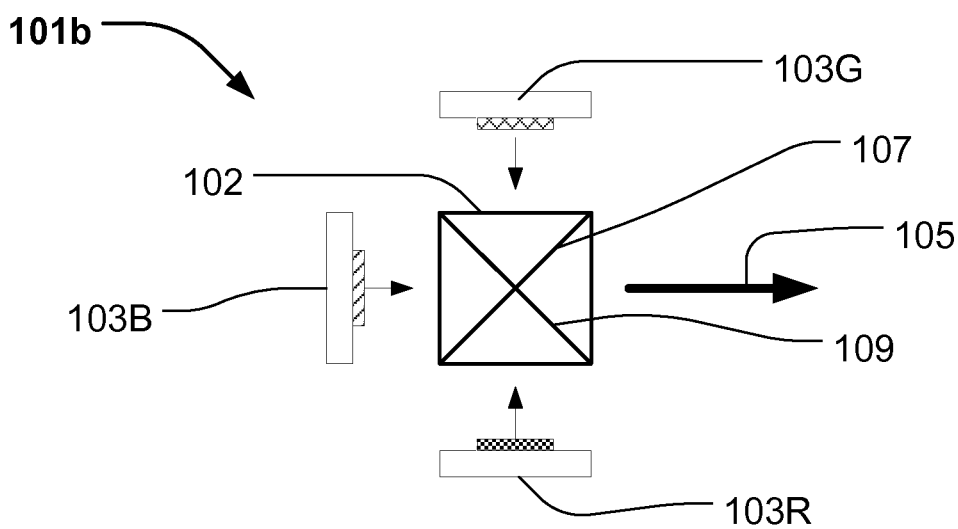

FIG. 1b illustrates prior-art color-combining system 101b comprising a color cube 102. This color cube is used to combine light from a red light source 103R, a green light source 103G and a blue light source 103B into a white light beam 105. Color cube 102 comprises a "red" dichroic reflector 107 adapted to reflect red light and transmit other colors and a "green" dichroic reflector 109 adapted to reflect green light and transmit other colors. The red and green light will thus be reflected by the red dichroic reflector and green dichroic reflector respectively whereas the blue light will pass directly through the color cube. The consequence is an output light beam which appears white in accordance with the rules of additive color mixing.

Figure 1C:
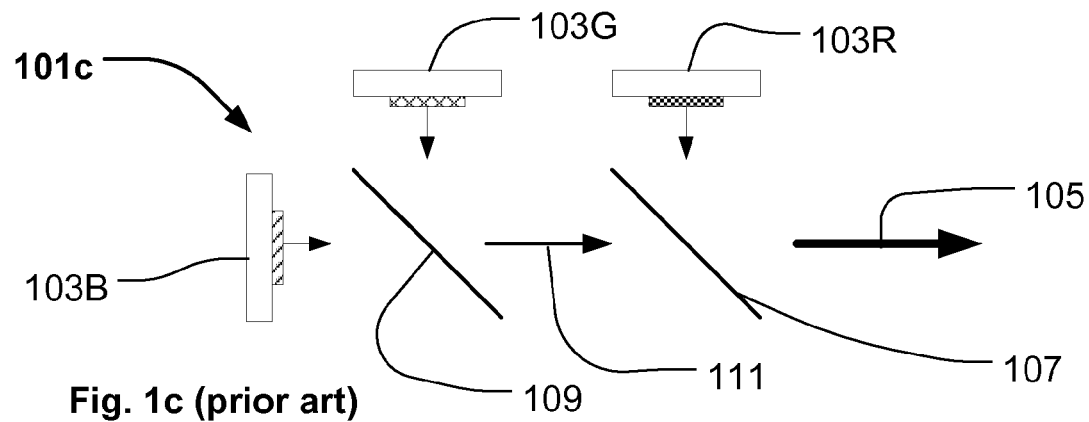
Figure 1D:
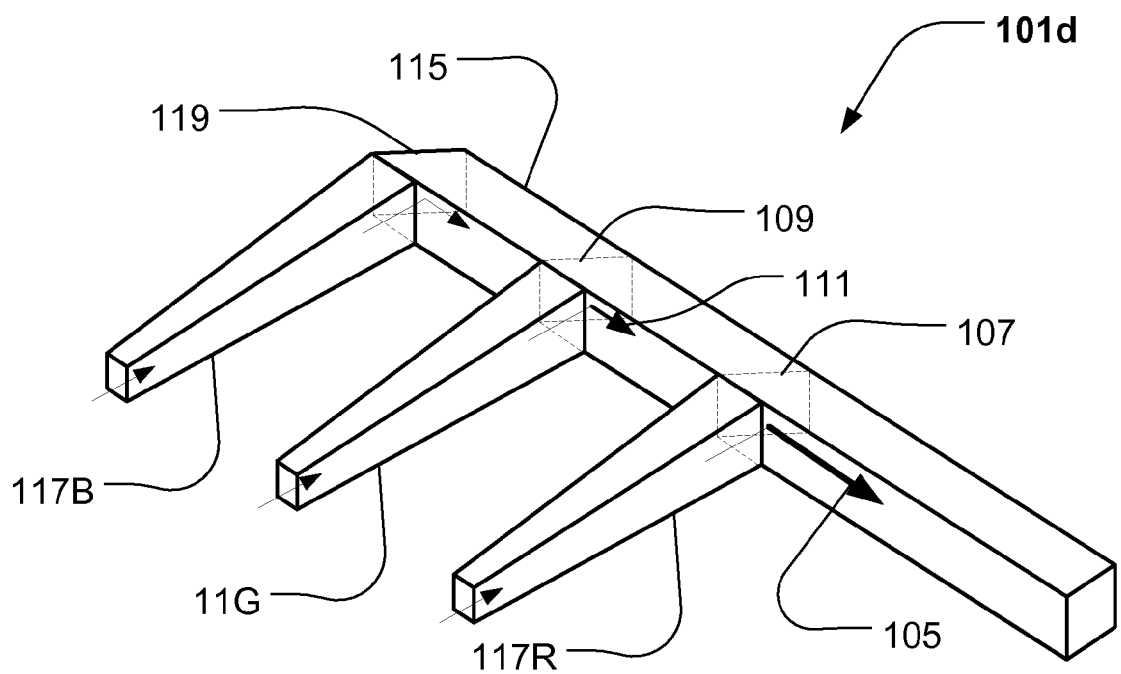

FIG. 1c illustrates a color-combining system 101c where light from red 103R, blue 103B and green 103G light sources are combined into one light beam 105. The colors are added together successively instead of using a color cube as illustrated in FIG. 1b. Firstly; the blue and green light are combined into a turquoise beam 111 using a green dichroic reflector similar as illustrated in FIG. 1a. Secondly; the turquoise beam 111 and red light are combined into a white light beam 105 using a red dichroic reflector similar to that illustrated in FIG. 1a. FIG. 1d illustrates a possible embodiment of the color-combining system 101d of FIG. 1c. The color-combining system is constructed of a main light pipe 115, a blue light pipe 117B, a green light pipe 117G and a red light pipe 117R. The light from the blue light source (not shown) is led into the blue light pipe 117B and coupled into the main light pipe 115 using a mirror 119. The light from the green light source (not shown) is led into the green light pipe 117G and coupled into the main light pipe 115 using a green dichroic reflector 109 positioned inside the main light pipe 115. Finally the light from the red light source (not shown) is led into the red light pipe 117R and coupled into the main light pipe 115 using a red dichroic reflector 107 positioned inside the main light pipe 115. The light travels inside the light pipes due to internal reflection.

One major disadvantage of the prior-art color-combining systems is the fact that the combined white light beam appears white, but comprises only of red, green and blue spectral components, and the color rendering of the resulting light beam is thus very bad. Furthermore, prior-art color-combining systems need at least two dichroic reflectors, which increases the cost of the color-combining systems and further complicates the manufacturing process as both dichroic reflectors need to be positioned precisely and accurately in the optical system. Prior-art color-combining systems also use 3 sources or source arrays at different positions and orientations, adding complexity and cost to the constructions. The dichroic reflectors also need to be angled with respect to the optical axis and the light beams of the colors need to be coupled into the first light beam at very accurate angles in order to align the three light beams properly.

FIG. 2a-2f illustrate simplified embodiments of the illumination device 201 according to the present invention, where the illumination device 201a-f in all figures comprises a first light source array 203, a second light source array 209 and a first dichroic reflector 211.

The first light source array 203 comprises at least a first light source R. The first light source R generates a first light beam 205R having a first spectral distribution. In the illustrated embodiment, the spectral distribution of the first light beam lies primarily within the red wavelengths and the beam thus appears red to a person. The first light beam propagates primarily in a first direction along an optical axis 207; meaning that the vector of propagation of the first light beam 205R has at least one component which is parallel with the optical axis and that the vector component which is parallel with the optical axis is larger than the vector components (there are 2 other vectors in 3D) perpendicular to the optical axis. In most embodiments, the angle between the first light beam and the optical axes is smaller than 33 degrees as this provides a compact illumination device and furthermore makes it possible to position a projecting system which can collect most of the light along the optical axes. The first light beam propagating primarily in a first direction along the optical axis will in these embodiments have an angle smaller then 33 degrees in relation to the optical axes. The light sources of the first array are in the illustrated embodiment positioned such the first light beam 205R propagates primarily in the first direction at and/or near the optical axis.

The second light source array 209 comprises at least a second light source B and the second light source B generates a second light beam 205B having a second spectral distribution. The spectral distribution of the second light beam is in the illustrated embodiment different from the first light beam and primarily distributed within the blue wavelengths. The second light beam 205B propagates primarily in a second direction opposite to the first direction and propagates also towards at least a part of the first light source array 203, meaning that the vector of propagation of the second light beam 205B has at least one component which is parallel with the optical axis and has an opposite direction (and opposite sign) compared to the similar component of the first light beam 205R. The vector component which is parallel with the optical axis is larger than the vector components perpendicular to the optical axis, meaning that the green light beam primarily travels along the optical axis but in a negative direction. The angle between the second light beam and the optical axes is in most embodiments smaller than 33 degrees, as is the case with the first light beam, but the second light beam propagates in the opposite direction along the optical axes. The second light beam propagating primarily in a second direction along the optical axis will in these embodiments have an angle smaller than 33 degrees in relation to the optical axes. The second light beam would also hit/impinge upon the first light source array 203 if it had not been for the dichroic reflector 211 positioned in the light beams as described below. The light sources of the second light source array 205 are in the illustrated embodiment positioned such that second light beam 205B propagates primarily in the second direction offset the optical axes.

The first dichroic reflector 211 is at least partially positioned in both the first light beam 205R and the second light beam 205B. The first dichroic reflector 211 is adapted to transmit at least a part of the first light beam 205R and to reflect at least a part of the second light beam 205R. The first dichroic reflector is positioned such that the second light beam is reflected before it would hit the first light source array 203 and least a part of the second light beam 205B propagates primarily in the first direction after being reflected by said at least first dichroic reflector 211. The second light beam will in contrast to the prior art described above propagate directly both towards the first light source array prior to being reflected by the dichroic reflector and propagate primarily in the first direction after being reflected by the dichroic reflector. The first light beam 205B propagates primarily in the first direction at and/or near the optical axis after being reflected by the first dichroic reflector. The second light source array can as a result be positioned very close to the optical axes and the light from the first light source array does not need to be reflected with a resulting loss of intensity as is the case with the known color cubes. The result is that both the first light beam 205B and the second light beam 205R propagate along the optical axis 205 and for instance through an optical gate 213. The second light beam 205B propagates directly towards the second light source array and it is thus possible to position the second light source array substantially opposite the first light source array. The light sources of the second light source array can thus be positioned very close to the optical axis and a very compact design can thus be achieved. A very compact illumination system is thus provided.

The illumination device 201b-f in FIG. 2b-2f comprises further at least a third light source G generating a third light beam 205G having a third spectral distribution. The spectral distribution of the third light beam is in the illustrated embodiment different from the first light beam 205R and the second light beam 205B and primarily distributed within the green wavelengths.

Figure 2A:
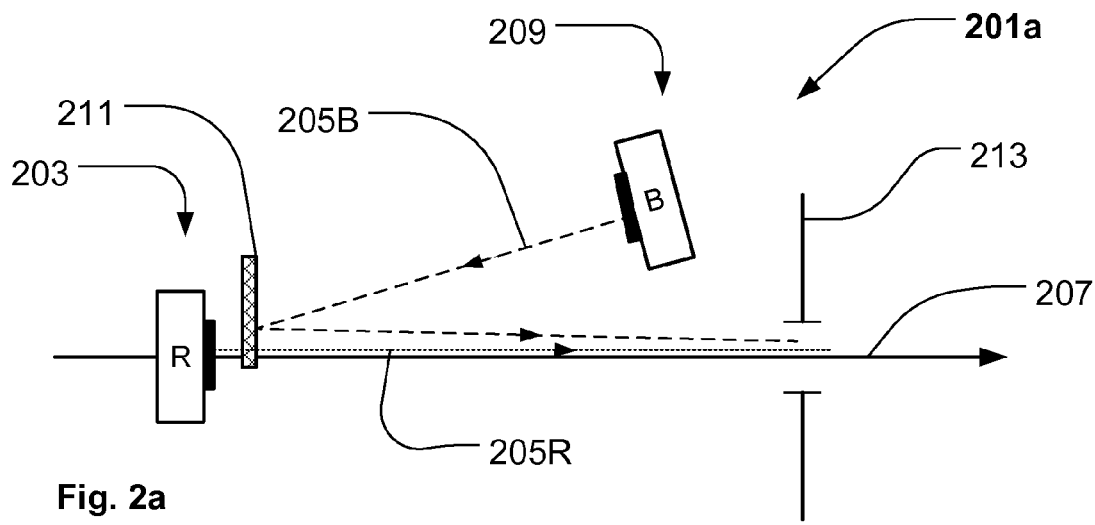
FIGS. 2a-2f illustrate simplified embodiments of the illumination device according to the present invention.
Figure 2B:
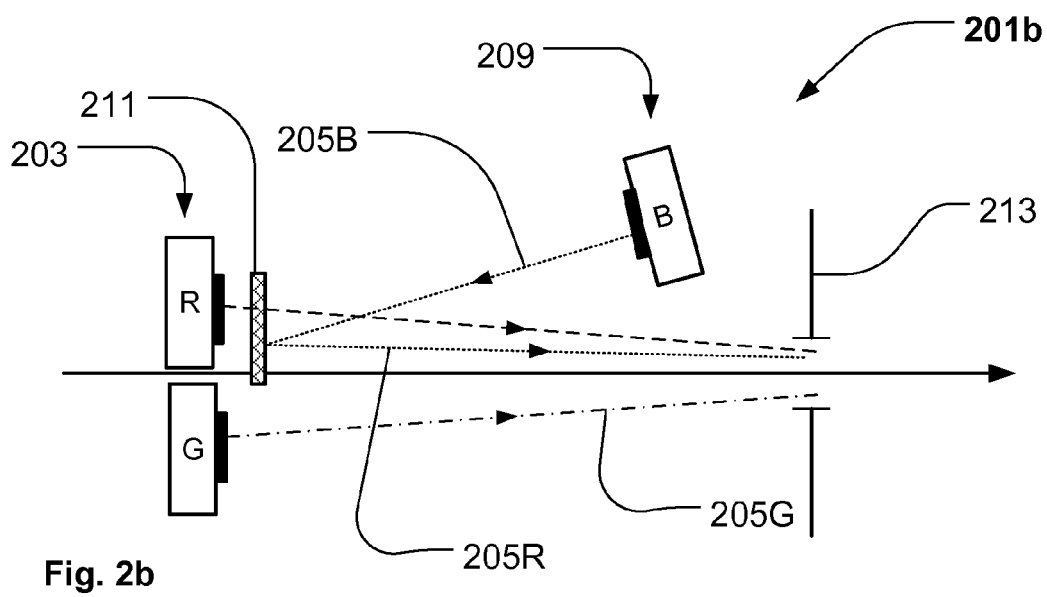
Figure 2C:
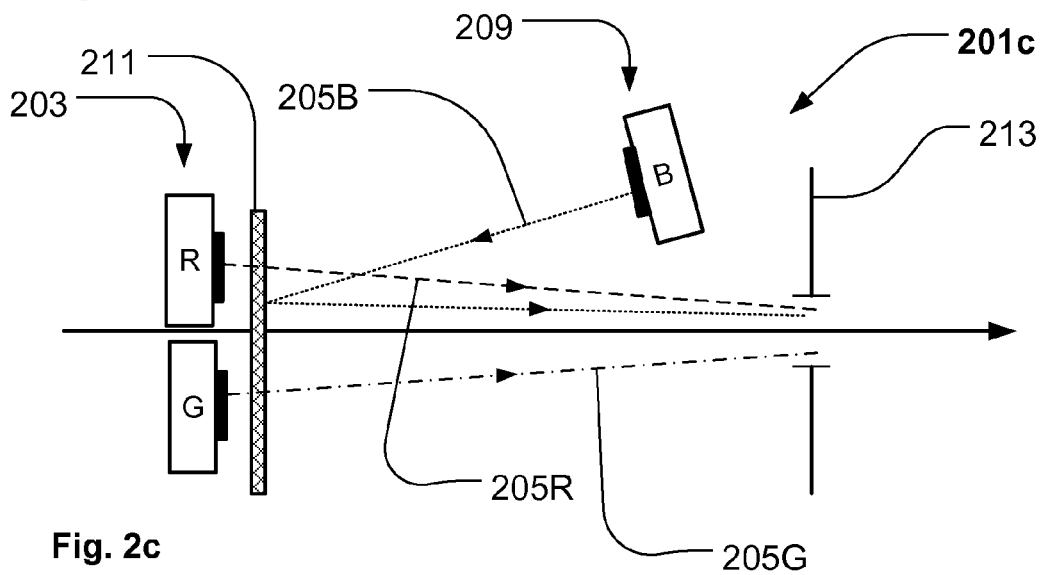

The first light source array 203 comprises in FIGS. 2b and 2c the third light source G and the third light beam 205G propagates primarily in the first direction along the optical axis. The third light beam 205G propagates in FIG. 2b along the optical axis and does not hit the first dichroic reflector 211. The third light source 205G in FIG. 2c is transmitted through a second dichroic filter positioned at least partially in the third light beam and in the second light beam 205B. The second dichroic reflector transmits at least a part of the third light beam and reflects at least a part of the second light beam and is in the illustrated embodiment integrated with the first dichroic filter. The dichroic reflector 211 of FIG. 2c is thus adapted to transmit both the first light beam 205R and the third light beam 205B and to reflect the second light beam 205B. The dichroic reflector in FIG. 2c is embodied as a high-pass filter (with respect to wavelength) with a cut-off wavelength (approximately 495 nm) between the green and blue wavelengths and will transmit wavelength higher then the cut-off wavelength (>495 nm=green and red light) and reflect blue light (<495 nm).

Figure 2D:
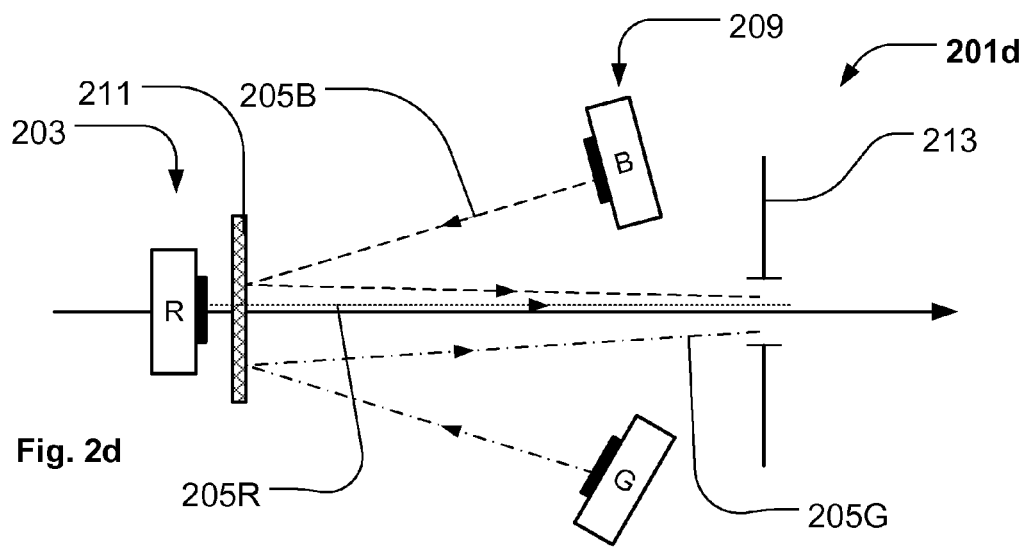
Figure 2E:
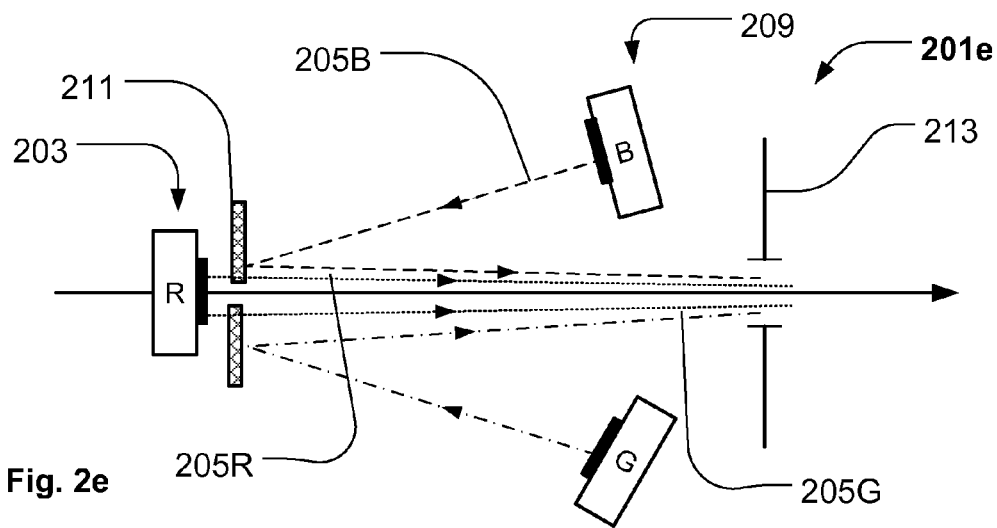
Figure 2F:
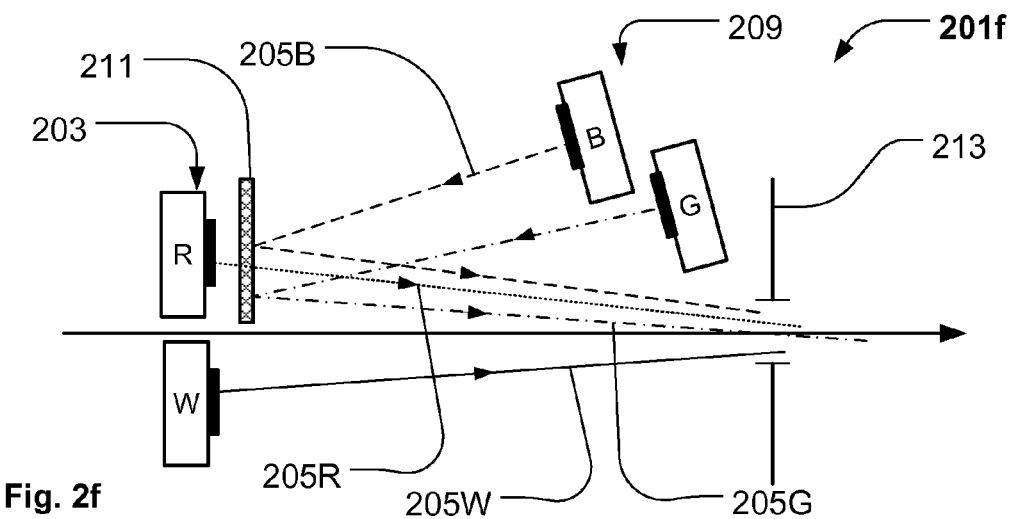

The second light source array 209 comprises in FIG. 2d-2f the third light source G. The third light beam propagates 205G like the second light beam 205B in primarily in a second direction towards at least a part of the first light source array and substantially opposite the first direction. At least a part of the third light beam 205G is like the second light beam 205B also reflected by the first dichroic reflector 211 and propagates primarily in the first direction after being reflected by the first dichroic reflector 211. The first dichroic reflector 211 of FIG. 2d is adapted to reflect both the second light beam 205B and the third light beam 205G and to transmit the first light beam. The dichroic reflector in FIG. 2d can thus be embodied as a high-pass filter (with respect to wavelength) with a cut-off wavelength (approximately 620 nm) between the green and red wavelengths and will transmit wavelength higher than the cut-off wavelength (>620 nm=red light) and reflect blue and green light (<620 nm). FIG. 2e illustrates an embodiment where a third dichroic reflector 211 is positioned at least partially in the first light beam and in the third light beam. The third dichroic reflector 211 transmits at least a part of the first light beam and reflects at least a part of the third light beam.

The illumination device 201f comprises in FIG. 2f at least a fourth light source W positioned in the first light source array. The fourth light source W generates a fourth light beam 205W having a fourth spectral distribution and propagates primarily in the first direction along the optical axis as described above. The fourth spectral distribution is a spectrally broadly distributed white light. The dichroic reflector is in the embodiment adapted to reflect the second and third light beam and to transmit the first light beam in the same manner as described above. The fourth light beam 205W propagates in FIG. 2f along the optical axis and does not hit the first dichroic reflector 211. The fourth white light beam can be used to add brightness to the light beam output at the optical gate 213 and further improve color rendering, as the broad spectral distribution will add the missing spectral components of the first, second and third light beams.

Figure 3:
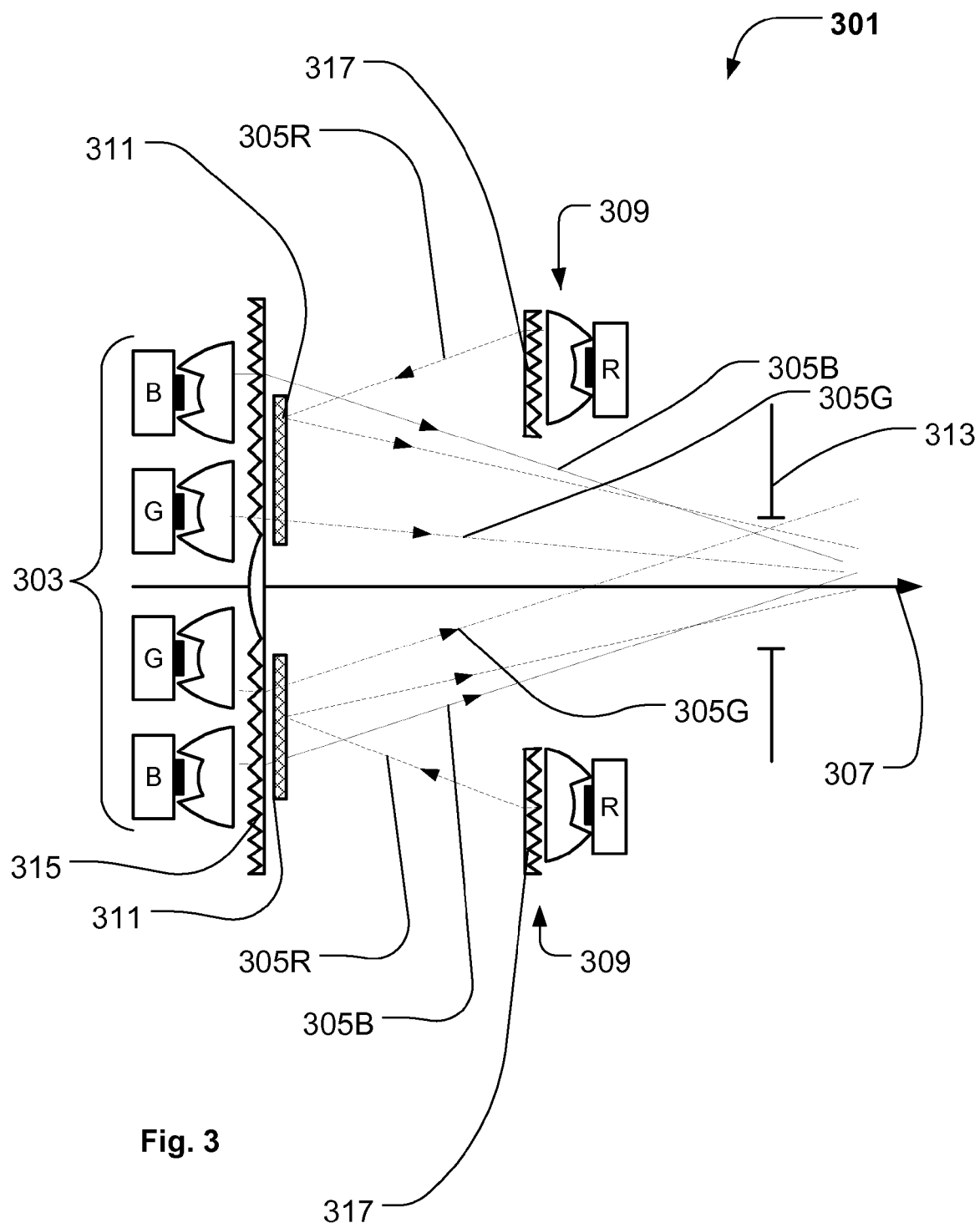
FIGS. 3-8 illustrate other embodiments of the illumination device according to the present invention.

FIG. 3 illustrates another embodiment of an illumination device 301 according the present invention. The illumination device comprises a first array 303 of green light sources G generating a first green light beam 305G (illustrated as dashed-dotted lines) having a green spectral distribution. The person skilled in the art realizes that a multiple number of green light beams are generated even though only two green light beams are illustrated. The green light beam propagates primarily in a first direction along an optical axis 307; meaning that the vector of propagation of the green light beam has at least one component which is parallel with the optical axis and that the vector component which is parallel with the optical axis is larger than the vector components perpendicular to the optical axis. The green light beam propagates thus primarily in a first direction along the optical axis.

The first array 303 of light sources comprises further a number of blue light sources generating a blue light beam 305B (illustrated as dotted lines throughout this application) having a blue spectral distribution. The person skilled in the art realizes that a multiple number of blue light beams are generated even though only two blue light beams are illustrated. The blue light beam propagates primarily in a first direction along the optical axis 307, meaning that the vector of propagation of the blue light beam has at least one component which is parallel with the optical axis and that the vector components which are parallel with the optical axis are larger than the vector components perpendicular to the optical axis. The blue light beam propagates thus primarily in a first direction along the optical axis.

The illumination device comprises further a second array 309 of light sources. The second array of light sources comprises a number of red light sources R generating a red light beam 305R having a red spectral distribution. The person skilled in the art realizes that a multiple number of red light beams are generated even though only two red light beams are illustrated. The red light beams propagate primarily in a second direction opposite to the first direction along the optical axis 305, meaning that the vector of propagation of the red light beam has at least one component which is parallel with the optical axis and has an opposite direction (and an opposite sign) to the similar components of the green and blue light beams. The vector component which is parallel with the optical axis is larger than the vector components perpendicular to the optical axis. The red light beam propagates thus primarily in a second direction along the optical axis. In other words, the red light beams travel in an opposite direction along the optical axis compared to the blue and green light beams and also towards the first array of light sources.

The illumination device comprises also dichroic reflectors 311 positioned in the green, blue and red light beams. The dichroic reflectors are in the illustrated embodiment embodied as a blue-green bypass filter which transmits the blue and green light beams and acts as a red mirror reflecting the red light beam. The consequence is that the green and blue light beams are transmitted through the dichroic reflectors 311 and thus continue propagating along the optical axis towards an optical gate 313. The red light beams that originally propagate in a second direction opposite the first direction along the optical axis and away from the optical gate are however reflected by the dichroic reflector and thus redirected in the first direction along the optical axis toward the optical gate.

In contrast with the prior-art color-combining systems, this illumination device uses only one dichroic filter and is thus more efficient and cost-effective, as each color dichroic filter always leads to loss of intensity and can cause unintended diffractions. The illumination device will furthermore not absorb as much energy and thus does not require as much cooling as the prior-art systems. It is further possible to add multiple light sources without exceeding the Etendue of an imaging system (not shown) positioned along the optical axis of the optical gate, as the light sources generate light beams of different colors which are combined using the diachroic filter. Another advantage is the fact that the light sources can be positioned very close to the optical axis because the light beams from the second light source are directed towards the first light source array.

The illumination device comprises in the illustrated embodiment first a converging means 315 that converges the green and blue light beams such that the green and blue light beams are focused at a position along the optical axis. The first converging means is positioned before the dichroic reflector and the blue and green light beams are thus diffracted before they are transmitted through the dichroic reflector. The consequence is that the red light beams are not deflected by the first converging means 315. The red light beams are however deflected by the second converging means 317 which is adapted to focus the read light beams at the same position (at the gate) along the optical axis as the green and blue light beams.

The illumination device illustrated in FIG. 3 is a spherical system where the green G and blue B light sources of the first array of light sources are distributed uniformly around the optical axes and are for instance arranged in a honeycomb pattern or in rings. The light sources of the shown embodiment are LEDs mounted on a PCB or directly on a cooling module, and the light from the LEDs is collimated by TIR lenses on top of each light source. The skilled person will realize that other kinds of light sources, such as discharge lamps, fluorescent lamps, plasma lamps, OLEDs, etc. could also be used. The light sources can for instance be a ring-shaped light source surrounding the optical axis. Also the collimation could be performed by other means than TIR lenses, such as reflectors, Köhler condensers, fish-eye lenses, Fresnel lenses or diffraction gratings. The first converging means is in the illustrated embodiment embodied as a Fresnel lens. The Fresnel lens collects the green/blue light into the gate. Essentially the focal length of the Fresnel lens should be approximately the same as the optical distance from Fresnel to gate. The Fresnel lens can for instance be a micro-Fresnel lens molded in polymer. However conventional lenses or other kinds of converging means can also be used. The first dichroic reflector 311 is positioned adjacent to the converging lens. The dichroic reflector could for instance be coated onto a Fresnel lens whereby the Fresnel lens and dichroic reflector are integrated together.

The red R light sources of the second array of light sources are arranged uniformly around the optical axes, for instance in a honeycomb pattern or in rings, in a similar way as the first array of light sources, with the difference that there are no light sources in the middle and the optical axis thus passes through an aperture in the second light source array. The light propagating primarily in the first direction will thus pass through the aperture in the second array of light sources. The red light sources R are similarly to the blue and green light sources embodied as LEDs mounted on a PCB and the light from the LEDs is collimated by TIR lenses on top of each light source. The skilled person will realize that other kinds of light sources, such as discharge lamps, fluorescent lamps, plasma lamps, OLEDs, etc. could also be used. The second converging means is embodied as a Fresnel lens shaped as a ring, collecting the red light into the gate via the dichroic reflector. The focal length of the second Fresnel lens should be approximately the same as the optical distance from the Fresnel lens via the dichroic reflector to the gate.

The red light sources are in this embodiment placed in the source plane with the longest optical path to the gate, as K2™ LED's are used where the red dies are smaller than the InGan™ Blue and Green LEDs. This results in a smaller divergent half-angle θ out of the TIR lens from the red light source. But as the spot in the gate approximately equals 2fθ, the longer focal length f of the Fresnel for the red dies compensates for the smaller size of the red die, and improves the color distribution. Furthermore, red green and blue LED's typically have dominant wavelengths in the range 630 nm, 525 nm and 455 nm respectively with the largest separation between green and red, making it easier and more efficient to make a green+blue filter red dichroic reflector than a green+red filter blue mirror or a red+blue filter green mirror, which also need two filter slopes (long pass and short pass) to work. Optimum efficiency is obtained when 2fθ is smaller than or equals gate diameter. So if different die sizes are used, this should be taken into consideration so that the spot sizes from different LED's match in size. This can be done by adjusting f or by adjusting θ out of the TIR by means of different TIR diameter and shape.

The color of the combined outgoing light beam at the gate can be varied by varying the intensity of the light sources in relation to each other as known in the art, e.g. by varying the current through the LEDs or using PWM techniques.

Figure 4:
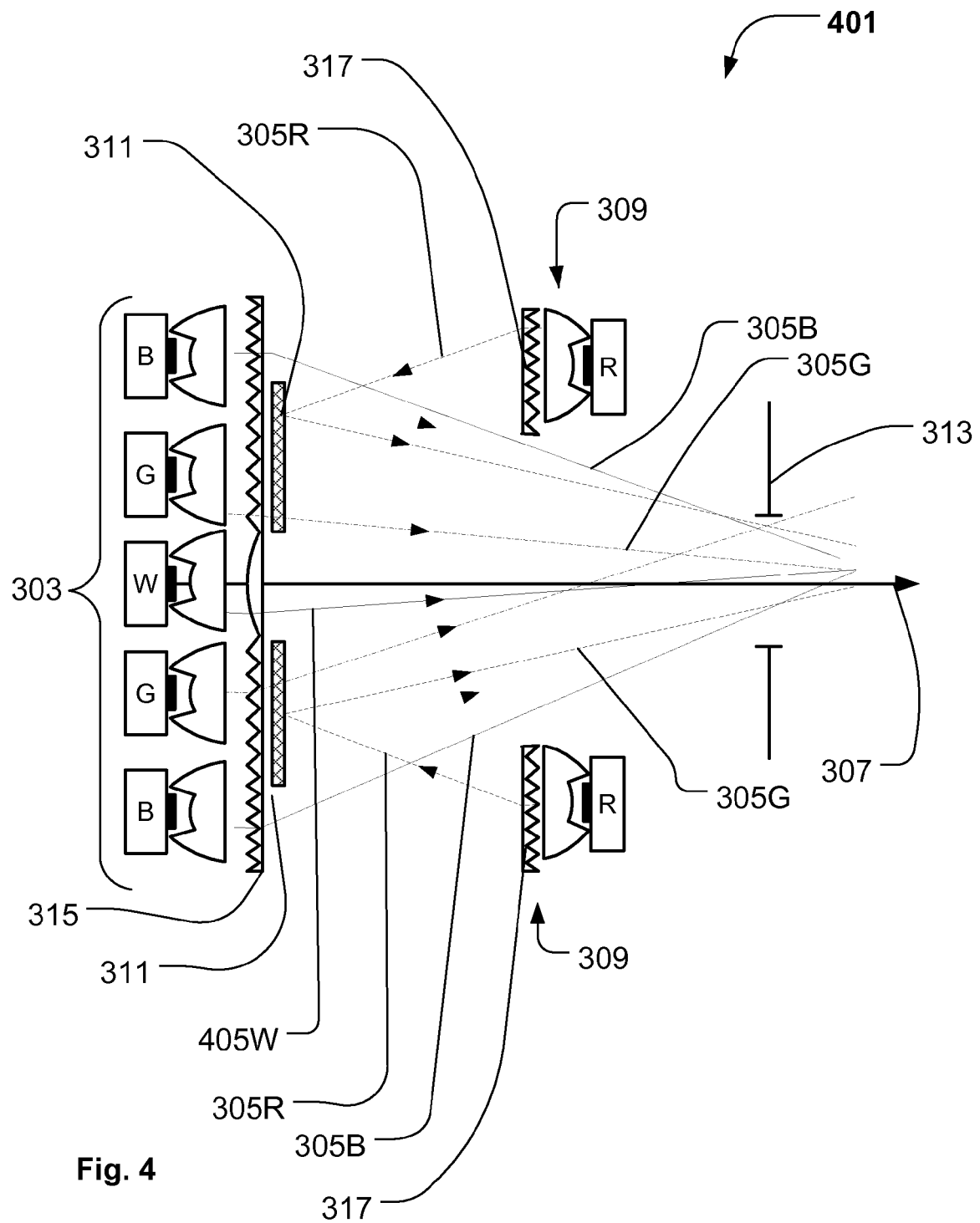

FIG. 4 illustrates another embodiment of the illumination device 401 according to the present invention. The illumination device 401 differs from the illumination device of FIG. 3 in that the first array of light sources comprises a white light source W emitting light having a broad spectral distribution that thus appears white. The white light 405W (solid line) beams pass through the converging means 315 and are focused at a point along the optical axis. The white light source makes it possible to add brightness to the combined outgoing light beam at the gate can and improves further the color rendering of the combined outgoing light beam, as the broad spectral distribution adds spectral components that are missing from the red, green and blue light sources. The white light source W is in the illustrated embodiment a white LED; however the skilled person would be able to use other kinds of white light sources such as discharge lamps, fluorescent lamps, plasma lamps, UV LEDs with phosphor material converting UV light into visible light, halogen etc.

Figure 5:
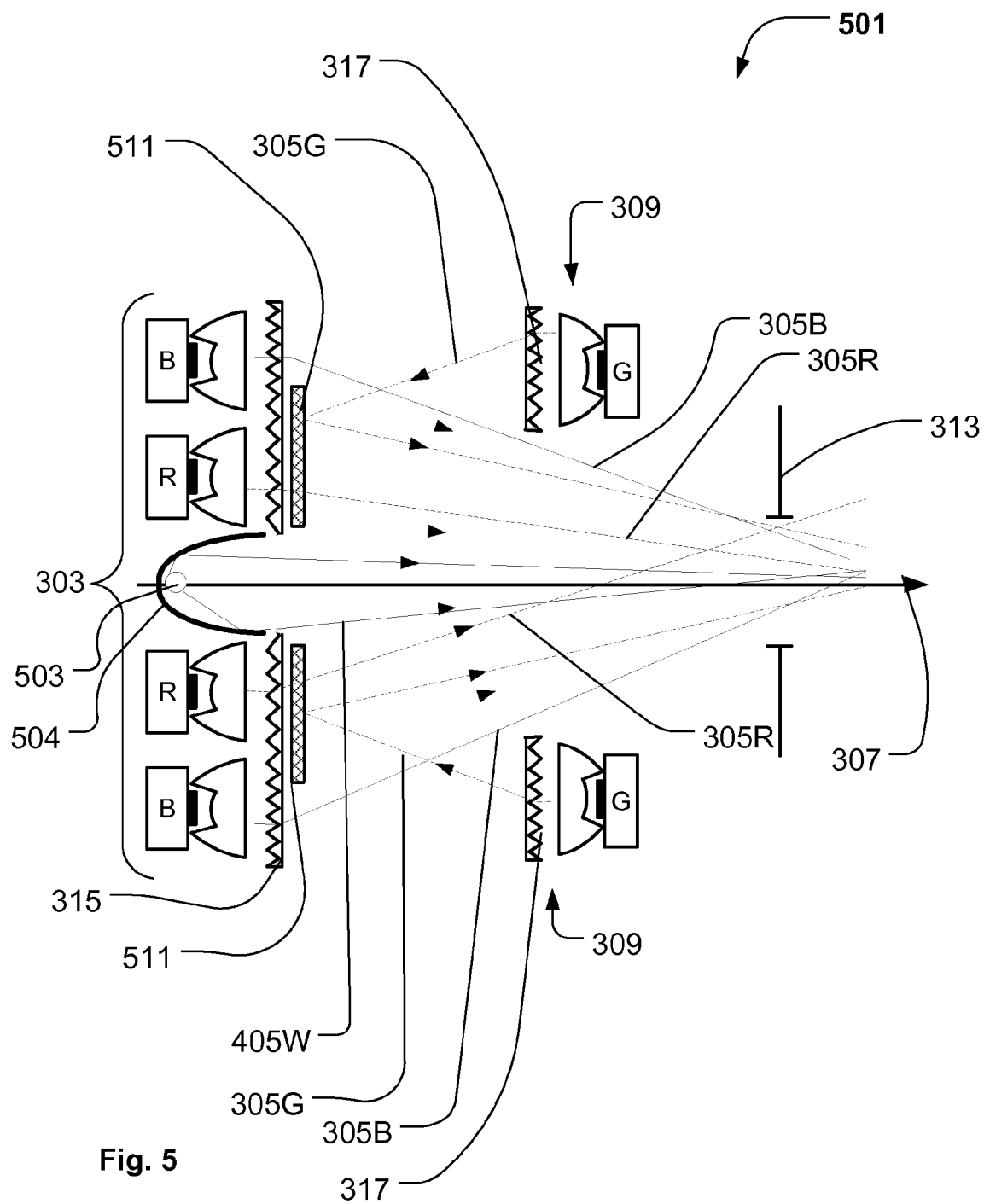

FIG. 5 illustrates another embodiment of the illumination device 501 according to the present invention. The white light source W introduced in FIG. 4 is in this embodiment a discharge lamp or plasma lamp 503 positioned inside a reflector 504. The middle part of the first converging means has in this embodiment been removed as the reflector 504 is designed to focus the white light beam. It is further illustrated that the second array of light sources comprises the green light sources and that the first array of light sources comprises the blue and red light sources. The dichroic reflector 511 is in this embodiment a green reflector reflecting green light and passing other colors.

Figure 6:
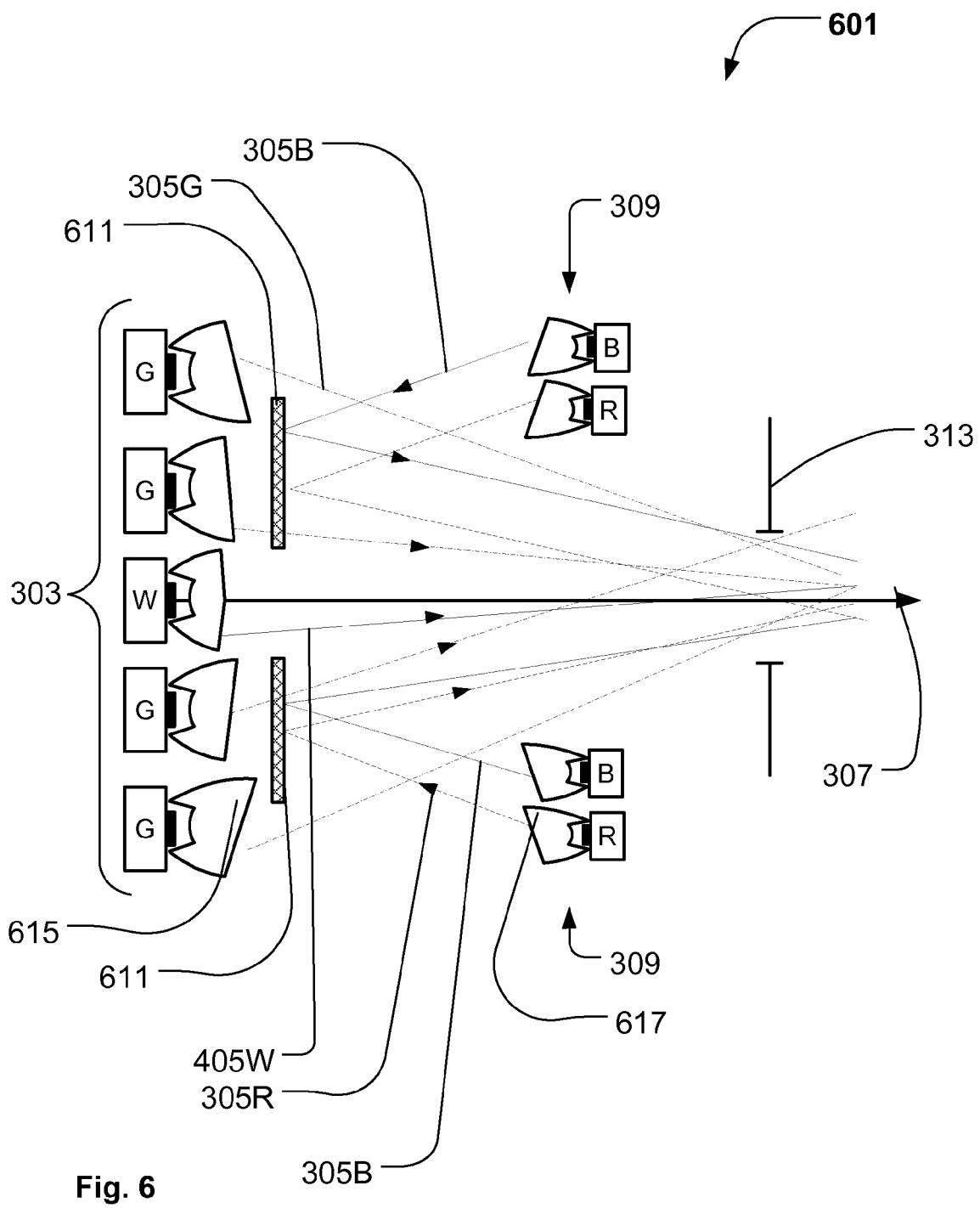

FIG. 6 illustrates another embodiment of the illumination device 601 according to the present invention. The first converging means 615 is in this embodiment integrated into the TIR lenses associated with the light sources of the first array of light sources 303. The second converging means 617 is in a similar way integrated into the TIR lenses associated with each of the light sources of the second array of light sources 309. TIR lenses can be designed asymmetrically and specifically for each diameter and distance so as to focus light directly into gate. In this way the Fresnel lenses (315 of FIG. 4) and some losses of intensity could be avoided. Different sizes and shapes of TIR lenses could also be used in order to compensate for differences in radiation pattern of the light sources and optical path length to the gate, and thus be optimized to still achieve good color mixing. It is further to be noticed that the second array of light sources comprises both red and blue light sources and the dichroic reflector 611 is thus adapted to reflect red and blue light. The first array of light sources comprises in this embodiment thus green and white light sources. The number of green light sources is larger than the number of blue and red light sources due the fact the green LED often has less intensity than red and blue LEDs. The increased number of green light sources will compensate for this.

Figure 7:
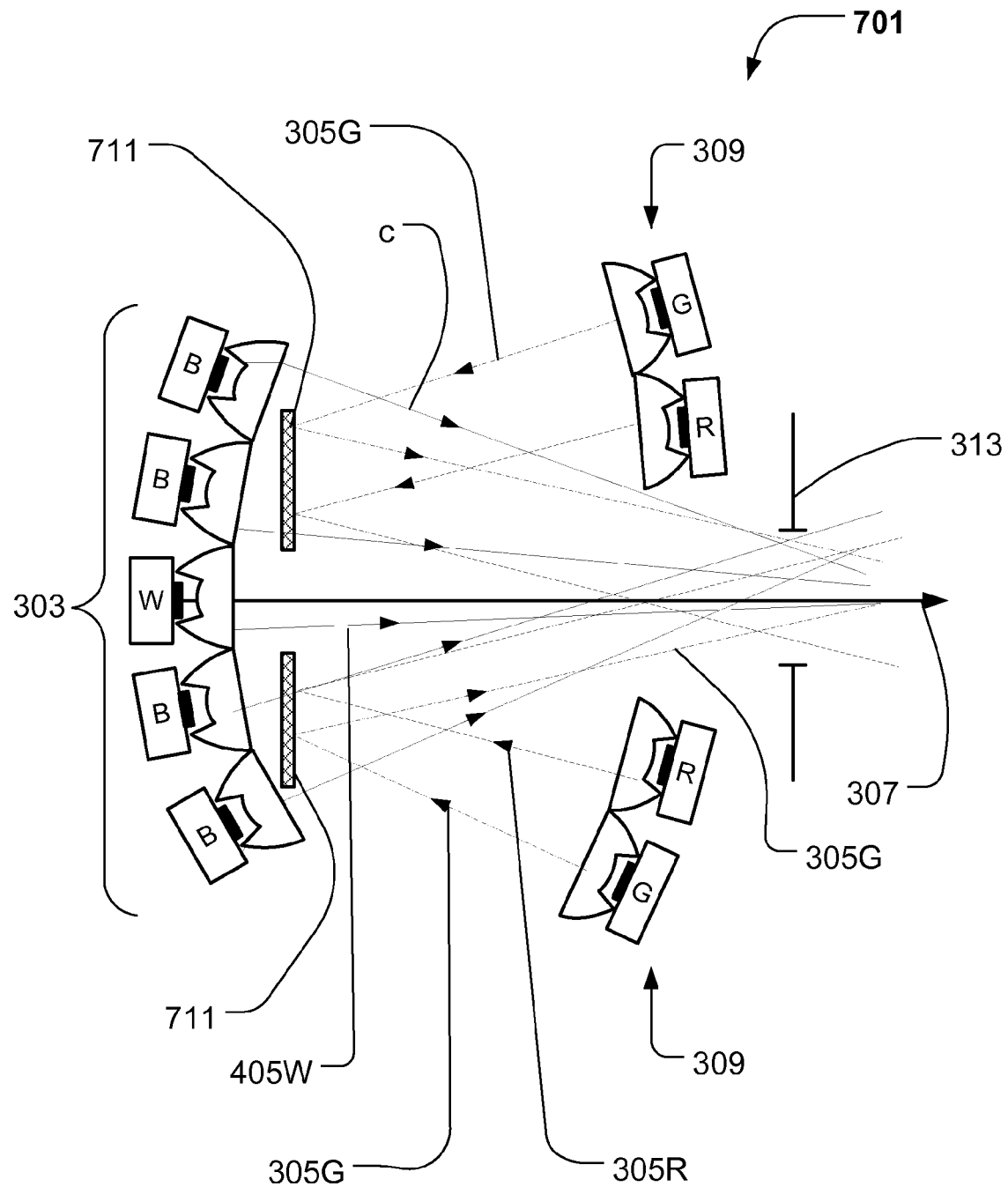

FIG. 7 illustrates another embodiment of the illumination device 701 according to the present invention. The light sources B and W of the first light source array are in this embodiment tilted with respect to a plane perpendicular to the optical axis and designed to focus a spot directly into the gate, instead of collimating. In this way the Fresnel lenses (315 of FIG. 4) and some losses of intensity can be avoided. The light sources R and G of the second array are in a similar way also tilted with respect to a plane perpendicular to the optical axis. Furthermore, all lenses in each plane could be of the same design and rotational symmetry. It is further to be noticed that the second array of light sources comprises both red and green light sources and the dichroic reflector 711 is thus adapted to reflect red and green light. The first array of light sources in this embodiment thus comprises blue and white light sources. The light sources are in the illustrated embodiment positioned on a circular (curved) plane with respect to the optical axis but could also be positioned on a plane perpendicular with the optical axis and the amount of tilt is thus adjusted accordingly.

It is to be noted that the illustrated embodiments only serve as illustrative examples of possible solutions and that the person skilled in the art would be able to construct alternative solutions within the scope of the claims.

The system can for instance also comprise collimating optics that is different from the TIR lenses shown in the figures. For instance as a reflector, Köhler condensers or various fish-eye lenses or any combination of these can be used.

The dichroic reflector can be made of smaller pieces glued to the plane side of the first converging means (Fresnel lens 315 of FIG. 4), with the coated side towards the gate. The use of index-matching glue means reducing reflection and losses when light from the first array of light sources passes through the converging means and dichroic reflector. The amount of dichroic material can further be reduced by restricting dichroic material to positions where light from the second array of light sources needs to be reflected towards the gate. The dichroic reflector can further be optimized for the used wavelengths and the angle of light incidence on the dichroic reflector. The efficiency of the diachroic reflector is in this way optimized.

The first converging means (Fresnel lens 315 in FIG. 4) could be open in the middle and the center TIR lens associated with the center LED of the first array of light sources can be designed to collect the light into the gate. This will reduce reflection losses due to reflection between the first converging means and the central light source of the first array. The different parts of the first and/or second converging means (315, 317) can also be specially designed to improve color mixing and output at the gate.

Figure 8:
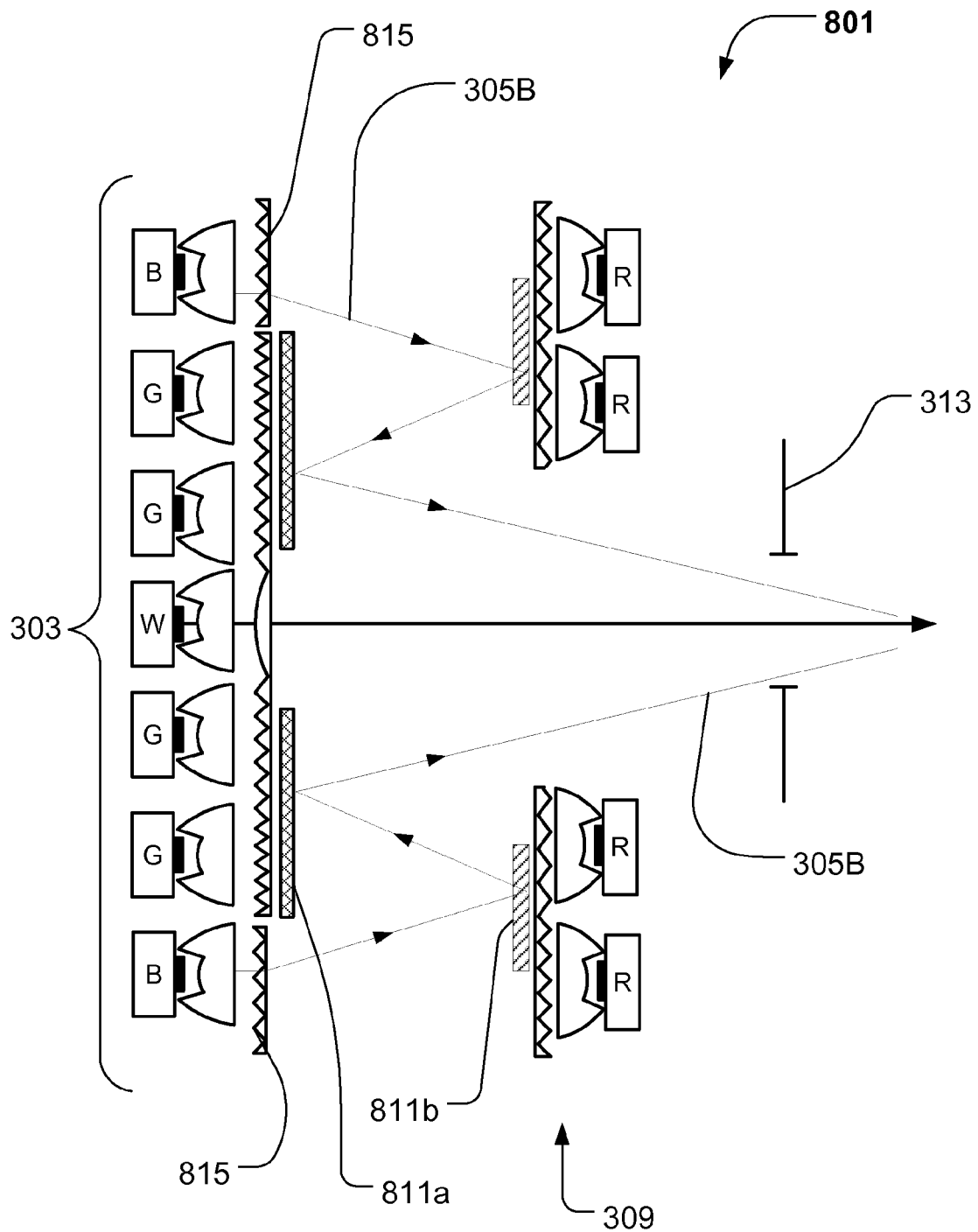

The colors of the different light sources in the first and second light source arrays can be combined in many different ways and identical light sources can also be included in both arrays of light sources. Further examples can for instance be that the first array of light sources comprises an outer ring of white light sources, or that the color of the light sources is alternated spherically around the optical axis. Some of the light beams can also experience multiple reflections between the two light source arrays before they are reflected along the optical axis. Such illumination device 801 is illustrated in FIG. 8, where the first light source array 303 comprises blue light sources B whose light beam 305B first passes through a converging means which is adapted to focus the blue light beam approximately at the gate. The blue light 305B is thereafter reflected by a dichroic reflector 811*b* positioned in front of the second array of light sources. The dichroic reflector 811*b* further transmits the red light beams (not shown for simplicity) emitted by the red light sources R. The blue light beams are then reflected by a dichroic reflector 811*a* positioned in front of the first light source array and directed along the optical axis. The dichroic reflector 811*a* is adapted to reflect both the blue and red light beams and further transmits the green light beams (not shown for simplicity).

The light sources can for Etendue-limited applications be unencapsulated LED dies, despite the fact that encapsulation of the die with index "matching" material increases extraction efficiency. This is because it also increases the Etendue of the sources by the refractive index of the encapsulant to the power of 2. For silicone with a refractive index of approx 1.5 this means that the Etendue of the source is increased by a factor of 2.25 and the number of sources which can be utilized is reduced by the same number.

Figure 9A:
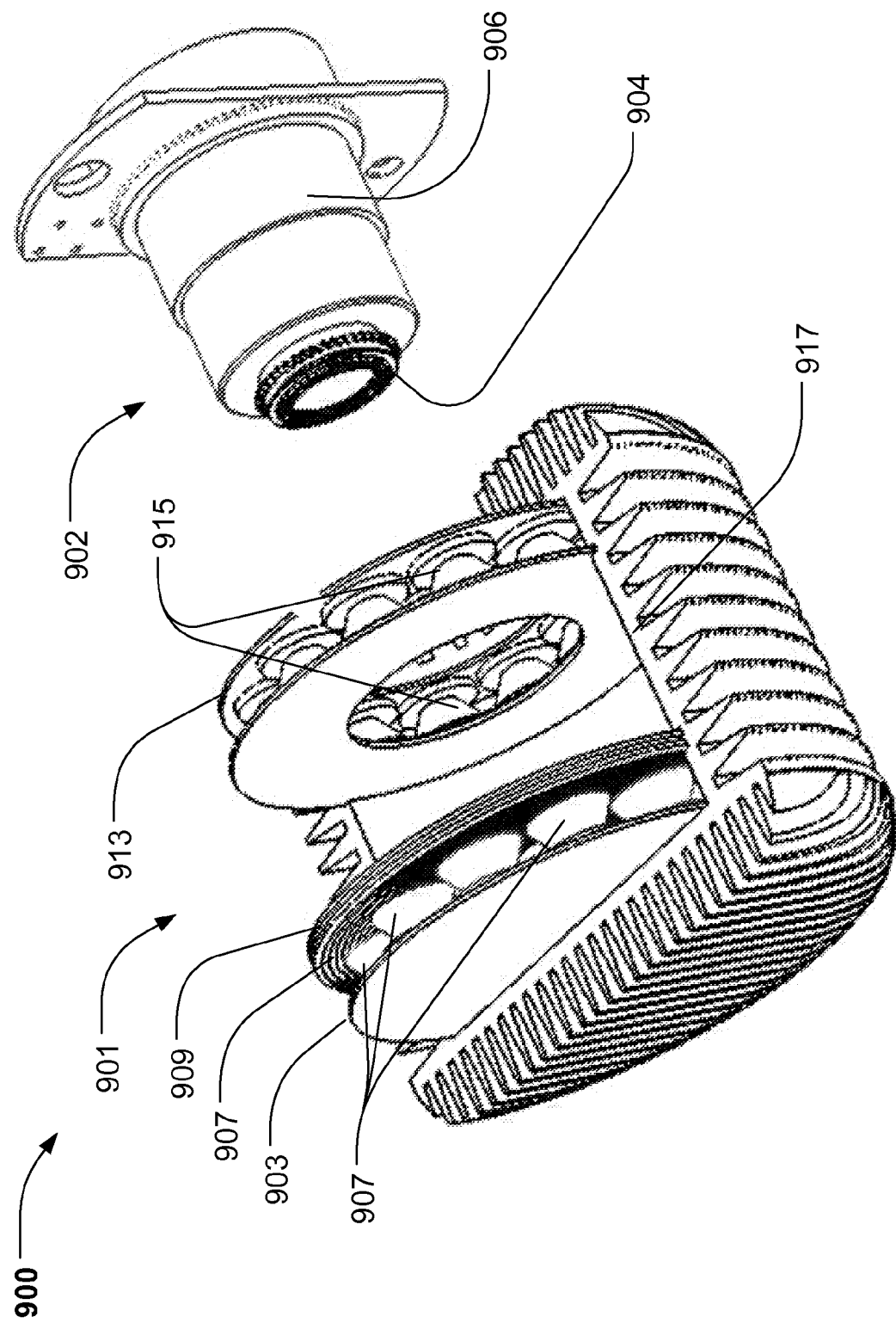
FIGS. 9a and 9b illustrate an embodiment of imaging device including an illumination device according to the present invention.
Figure 9B:
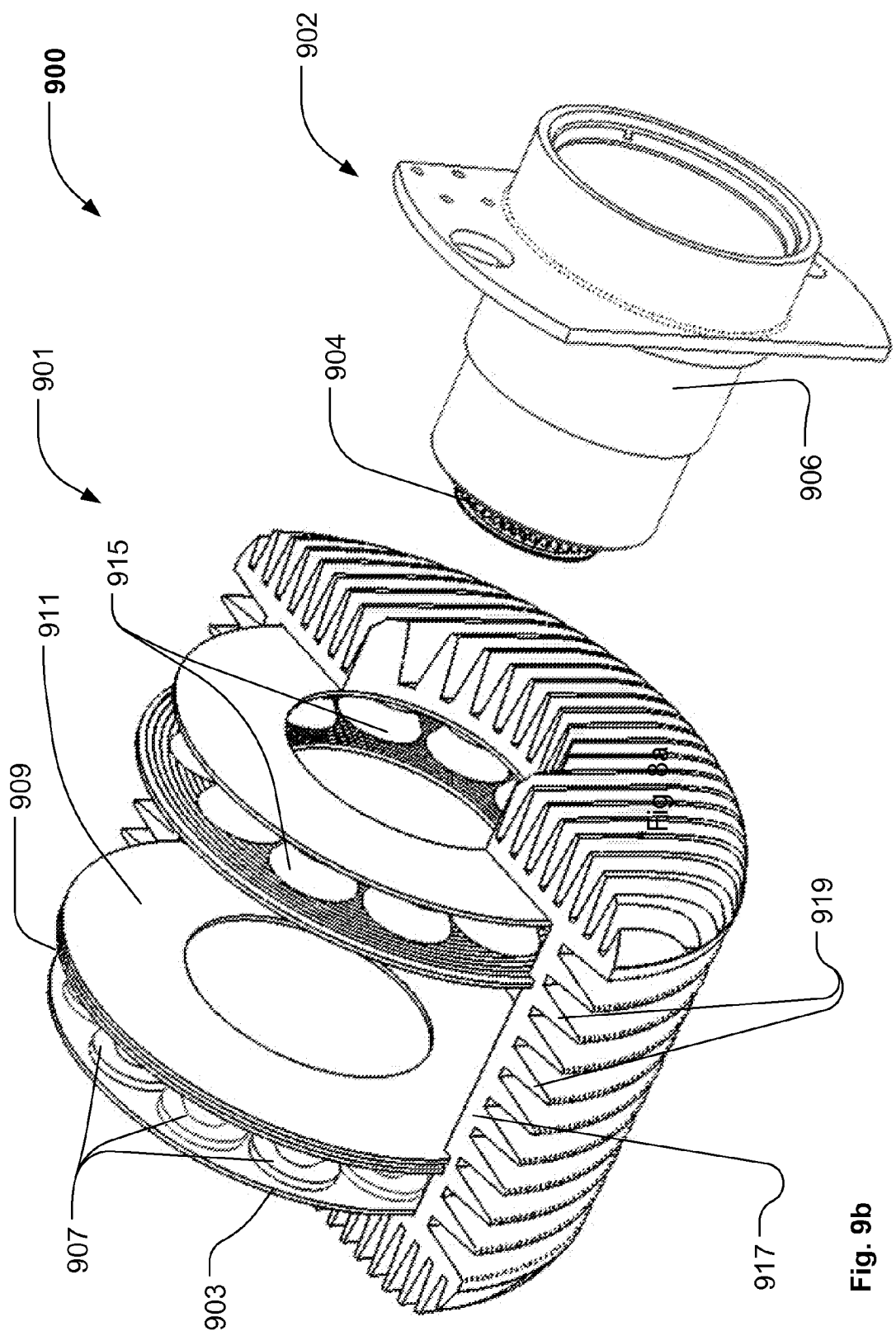

FIG. 9 illustrates a projecting system 900 comprising an illumination device 901 according to the present invention. FIGS. 9*a* is a back perspective view and 9*b* is a front perspective view of the projecting system. The projecting system 900 comprises an illumination device 901 and a beam-shaping and imaging system 902. The illumination device 901 generates a beam of light (not shown) which propagates towards the beam-shaping and imaging system 902.

The beam-shaping and imaging system 902 is illustrated as a GOBO system forming the light beam and projecting the beam light beam onto a surface. The beam shaping and imaging system 902 comprises a GOBO 904 and imaging optics 906 as known in the art of entertainment lighting. The imaging optics collects the light beam shaped by the GOBO 904 and is movable along the optical axis in order to focus the GOBO onto a surface.

The illuminating device 901 comprises a first array of light sources 903 comprising a number of LED's (hidden below the TIR lenses) mounted on a PCB 903 and covered by TIR lenses 905. A polymer micro-Fresnel lens 907 is mounted adjacent to the TIR lenses and a ring-shaped dichroic reflector 909 is mounted adjacent to the polymer micro-Fresnel lens 907. The illumination device comprises also a second array of light sources comprising a number of LEDs (hidden below the TIR lenses) mounted on a ring-shaped PCB 913 and covered by TIR lenses 915. A ring-shaped Fresnel lens is further positioned adjacent to the TIR lenses 915 of the second array of light sources. The illustrated illumination device is thus a possible embodiment of the illumination devices illustrated in FIGS. 3 and 4.

The components of the illumination device are mounted in a housing 917 (only one half of the housing is shown), for instance by positioning and securing a part of the components in a groove at the internal side of the housing. The housing is provided with cooling fins 919 adapted to dissipate heat away from the optical components connected to the yoke.

The projecting system can be incorporated in a moving head light fixture comprising a base, a yoke rotatable connected to said base and a head rotatable connected to the yoke.

The projecting system can also be used in a display system in which case the GOBO 903 would be replaced by a digital imaging component in which images are supplied by an imaging system. The digital imaging component can for instance be DMD, DLP, LCD or LCOS. The person skilled in such display systems knows how to modify the projecting system 900 in order to integrate such digital imaging component into the system.

Figure 10:
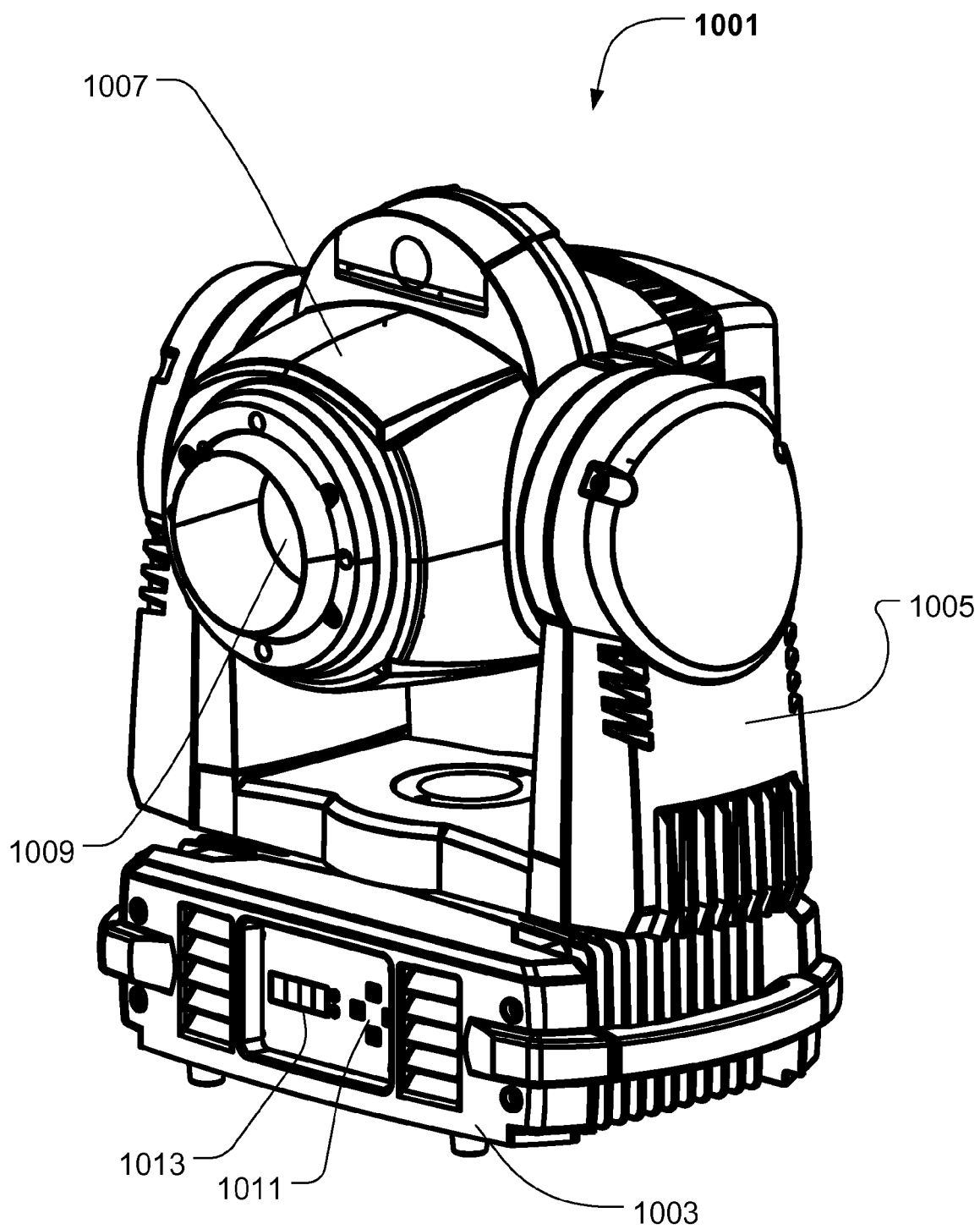
FIG. 10 illustrates a moving head light fixture according to the present invention.

FIG. 10 is a perspective view of moving head light fixture 1001 where a illumination device according to the present invention have been integrated into the head. The moving head lighting fixture 1001 comprises a base 1003, a yoke 1005 rotatable connected to the base and a head rotatable connected 1007 to the yoke. The head comprises an illumination device according to the present invention and generates a light beam (not shown) exiting the head through an exit lens 1009. The moving head light fixture comprises first rotating means for rotating the yoke in relation to the base, for instance by rotating a shaft connected to the yoke by using a motor positioned in the base. The moving head light fixture comprises also second rotating means for rotating the head in relation to the yoke, for instance by rotating a shaft connected to the head by using a motor positioned in the yoke. The skilled person would realize that the rotation means could be constructed in many different ways using mechanical components such as motors, shafts, gears, cables, chains, transmission systems etc.

The moving head light fixture receives electrical power from an external power supply. The electrical power is received by an internal power supply which adapts and distributes electrical power through internal power lines to the subsystems of the moving head. The internal power system can be constructed in many different ways. The light fixture comprises also a controller which controls the other components (other subsystems) in the light fixture based on an input signal indicative of at least one light effect parameter and at least one position parameter. The controller receives the input signal from a light controller (nor shown) as known in the art of intelligent and entertainment lighting for instance by using a standard protocol like DMX, ArtNET, RDM etc. The light effect parameter is indicative of at least one light effect parameter of said light beam for instance the amount of dimming and/or the dimming speed of the light beam, a color that a CMY system should mix, the kind of color filter that a color filter system should position in the light beam and/or the kind of gobo that the gobo system should position in the light beam, the divergence of the light beam that light fixture should create using a zoom system, a focus distance that indicate the distance form the lens to a surface where a gobo effect should be imaged, etc.

The controller is adapted to send commands and instructions to the different subsystems of the moving head through internal communication lines. The internal communication system can be based on a various type of communications networks/systems.

The moving head can also have user input means enabling a user to interact directly with the moving head instead of using a light controller to communicate with the moving head. The user input means 1011 could for instance be bottoms, joysticks, touch pads, keyboard, mouse etc. The user input means can also be supported by a display 1013 enabling the user to interact with the moving head through menu system shown on the display using the user input means. The display device and user input means could in one embodiment also be integrated as a touch screen.

The invention claimed is:

1. An illumination device comprising:
   a first light source array comprising at least a first light source; said first light source generates a first light beam having a first spectral distribution; said first light beam propagates primarily in a first direction along an optical axis, where the angle between said first light beam and said optical axis is smaller than 33 degrees;
   a second light source array comprising at least a second light source, said second light source generates a second light beam having a second spectral distribution;
   at least one first dichroic reflector positioned at least partially in said first light beam and said second light beam; said first dichroic reflector transmits at least a part of said first light beam and reflects at least a part of said second light beam;
   wherein
   that said second light beam propagates primarily in a second direction along said optical axis substantially opposite said first direction and towards at least a part of said first light source array, and where the angle between said second light beam and said optical axis is smaller than 33 degrees;
   that at least a part of said second light beam propagates primarily in said first direction after being reflected by said at least one first dichroic reflector.

2. An illumination device according to claim 1 wherein that said second light sources of said second light source array are distributed uniformly around said optical axis.

3. An illumination device according to claim 1 wherein that said second light source array is spherically distributed around said optical axis.

4. An illumination device according to claim 2 wherein that said optical axis passes through an aperture in said second light source array.

5. An illumination device according to claim 1 wherein that said illumination device comprises at least a third light source generating a third light beam having a third spectral distribution.

6. An illumination device comprising:
   a first light source array comprising at least a first light source; said first light source generates a first light beam having a first spectral distribution; said first light beam propagates primarily in a first direction along an optical axis;
   a second light source array comprising at least a second light source, said second light source generates a second light beam having a second spectral distribution;

at least one first dichroic reflector positioned at least partially in said first light beam and said second light beam; said first dichroic reflector transmits at least a part of said first light beam and reflects at least a part of said second light beam;

wherein that said second light beam propagates primarily in a second direction along said optical axis substantially opposite said first direction and towards at least a part of said first light source array;

that at least a part of said second light beam propagates primarily in said first direction after being reflected by said at least one first dichroic reflector; and that said first light source array comprises a third light source generating a third light beam having a third spectral distribution, and that said third light beam propagates primarily in said first direction along said optical axis.

7. An illumination device according to claim 6 further comprising at least one second dichroic reflector positioned at least partially in said third light beam and said second light beam; said second dichroic reflector transmits at least a part of said third light beam and reflects at least a part of said second light beam.

8. An illumination device according to claim 6 that said second light source array comprises said third light source and that said third light beam propagates primarily in said second direction along said optical axis and towards at least a part of said first light source array and substantially opposite to said first direction;

that at least a part of said third light beam propagates primarily in said first direction after being reflected by said first dichroic reflector which also reflects at least a part of said third light beam.

9. An illumination device according to claim 6 wherein that second light source array comprises said third light source and that said third light beam propagates primarily in said second direction along said optical axis and towards at least a part of said first light source array and substantially opposite to said at first direction;

that at least a part of said third light beam propagates primarily in said first direction after being reflected by at least a third dichroic reflector positioned at least partially in said first light beam and said third light beam; said third dichroic reflector transmits at least a part of said first light beam and reflects at least a part of said third light beam.

10. An illumination device comprising:

a first light source array comprising at least a first light source; said first light source generates a first light beam having a first spectral distribution; said first light beam propagates primarily in a first direction along an optical axis;

a second light source array comprising at least a second light source, said second light source generates a second light beam having a second spectral distribution;

at least one first dichroic reflector positioned at least partially in said first light beam and said second light beam; said first dichroic reflector transmits at least a part of said first light beam and reflects at least a part of said second light beam;

wherein that said second light beam propagates primarily in a second direction along said optical axis substantially opposite said first direction and towards at least a part of said first light source array;

that at least a part of said second light beam propagates primarily in said first direction after being reflected by said at least one first dichroic reflector; and that at least said first array of light sources comprises at least a fourth light source generating a fourth light beam having a fourth spectral distribution, said fourth light beam propagates primarily in said first direction and where said fourth spectral distribution is a spectrally broadly distributed white light.

11. An illumination device according to claim 1 further comprising converging means converging at least one of said light beams from said first light source array or said second light source array.

12. An illumination device according to claim 1 wherein that at least one of said dichroic reflectors is substantially perpendicular to first direction.

13. A projecting device comprising:

a digital imaging device an imaging system, adapted to project images from said digital imaging device at a surface, wherein comprising an illumination device according to claim 1, and in that said illumination device illuminates least a part of said digital imaging device.

14. A moving head light fixture comprising:

a base a rotatable yoke connected to said base, a rotatable head connected to said yoke, wherein that said head comprises an illumination device according claim 1.

15. A moving head light fixture according to claim 14 further comprising a beam-shaping device and an imaging system adapted to project said beam-shaping device at a surface, and in that said illumination device illuminates at least part of said beam-shaping device.

16. A method of illumination comprising the steps of:

generating a first light beam having a first spectral distribution;

directing said first light beam primarily in a first direction along an optical axis, where the angle between said first light beam and said optical axis is smaller than 33 degrees;

generating a second light beam having a second spectral distribution;

transmitting at least a part of said first light beam through a dichroic reflector;

wherein that said method further comprises the steps of:

directing said second light beam in a second direction substantially opposite to said first direction and towards a light source generating said first light beam, where the angle between said first light beam and said optical axis is smaller than 33 degrees;

reflecting and directing at least a part of said second light beam using said dichroic reflector primarily in said first direction.

17. An illumination device according to claim 5 wherein that said second light source array comprises said third light source and that said third light beam propagates primarily in said second direction towards at least a part of said first light source array and substantially opposite to said first direction, where the angle between said first light beam and said optical axis is smaller than 33 degrees;

that at least a part of said third light beam propagates primarily in said first direction after being reflected by at least a third dichroic reflector positioned at least partially in said first light beam and said third light beam;

said third dichroic reflector transmits at least a part of said first light beam and reflects at least a part of said third light beam.

18. An illumination device according to claim 5 wherein that at least said first array of light sources comprises at least a fourth light source generating a fourth light beam having a fourth spectral distribution, said fourth light beam propagates primarily in said first direction, where the angle between said first light beam and said optical axis is smaller than 33 degrees and that said fourth spectral distribution is a spectrally broadly distributed white light.

19. An illumination device according to claim 5 wherein
that said second light source array comprises said third light source and that said third light beam propagates primarily in said second direction along said optical axis and towards at least a part of said first light source array and substantially opposite to said first direction, where the angle between said third light beam and said optical axis is smaller than 33 degrees;
that at least a part of said third light beam propagates primarily in said first direction after being reflected by said first dichroic reflector which also reflects at least a part of said third light beam.

20. An illumination device according to claim 6 wherein that at least said first array of light sources comprises at least a fourth light source generating a fourth light beam having a fourth spectral distribution, said fourth light beam propagates primarily in said first direction, where the angle between said fourth light beam and said optical axis is smaller than 33 degrees and where said fourth spectral distribution is a spectrally broadly distributed white light.

\* \* \* \* \*